(12) United States Patent
Garnett et al.

(10) Patent No.: US 6,471,211 B1
(45) Date of Patent: Oct. 29, 2002

(54) SEAL ASSEMBLY

(75) Inventors: Mark W. Garnett; Danny R. Sink, both of Chester, VA (US)

(73) Assignee: Brenco, Incorporated, Petersburg, VA (US)

( * ) Notice: Subject to any disclaimer, the term of this patent is extended or adjusted under 35 U.S.C. 154(b) by 0 days.

(21) Appl. No.: 09/649,366

(22) Filed: Aug. 28, 2000

(51) Int. Cl.[7] ................................................ F16J 15/56
(52) U.S. Cl. ..................... 277/351; 277/371; 277/559; 277/572; 277/412; 384/486
(58) Field of Search .................... 277/371, 411, 277/412, 551, 559, 562, 572, 573, 575, 576; 384/484, 485, 486

(56) References Cited

U.S. PATENT DOCUMENTS

| | | | |
|---|---|---|---|
| 4,106,781 A | | 8/1978 | Benjamin et al. |
| 4,432,557 A | * | 2/1984 | Drucktenhengst ............ 277/351 |
| 4,434,985 A | | 3/1984 | Sonnerat |
| 4,513,976 A | | 4/1985 | Bentley et al. |
| 4,667,967 A | * | 5/1987 | Deuring ...................... 277/351 |
| 4,699,526 A | * | 10/1987 | Sato ............................ 384/486 |
| 4,755,067 A | | 7/1988 | Asberg et al. |
| 4,789,252 A | | 12/1988 | Dreschmann et al. |
| 4,863,292 A | | 9/1989 | Dreschmann et al. |
| 4,966,473 A | | 10/1990 | Jacob |
| 4,981,303 A | * | 1/1991 | Matsushima et al. ........ 277/351 |
| 5,024,449 A | | 6/1991 | Otto |
| 5,042,822 A | | 8/1991 | Dreschmann et al. |
| 5,149,207 A | | 9/1992 | Vignoito |
| 5,183,269 A | | 2/1993 | Black et al. |
| 5,186,548 A | | 2/1993 | Sink |
| 5,211,406 A | * | 5/1993 | Katzensteiner .............. 277/351 |
| 5,431,872 A | | 7/1995 | Sink |
| 5,511,886 A | | 4/1996 | Sink |
| 5,522,600 A | * | 6/1996 | Duckwall .................... 277/402 |
| 5,553,870 A | * | 9/1996 | Czekansky et al. ......... 277/559 |
| 5,577,741 A | | 11/1996 | Sink |
| 5,975,533 A | * | 11/1999 | Hubbard et al. ............. 277/351 |
| 6,315,296 B1 | * | 11/2001 | Oldenburg ................... 277/353 |

OTHER PUBLICATIONS

John J. Dwyer, Jr., "Wheel Seals: Keeping the Oil In and the Dirt Out", Fleet Owner, Aug. 1987, pp. 60–65.

* cited by examiner

Primary Examiner—Anthony Knight
Assistant Examiner—Michael W White
(74) Attorney, Agent, or Firm—Edward J. Brosius (57) ABSTRACT

An improved unitized bearing seal assembly employs a resilient primary seal lip, a secondary seal lip and an excluder lip carried by a first seal case. The seal lips contact surfaces of a second seal case. One of the seal cases rotates relative to the other. The bearing seal assembly also includes a labyrinth seal positioned radially inboard of the resilient seal lips. The labyrinth seal has two axially-extending gaps. One of the axially extending gaps is defined by a resilient axial lip. The two axial gaps are joined by a radial gap. One of the surfaces defining the radial gap comprises chaplets with recessed surfaces between the chaplets. The chaplets include radially directed surfaces and inclined surfaces joining the radially directed surfaces with the recessed surfaces. These surfaces are shaped to provide hydrodynamic pumping action. A lubricant cavity is located between the labyrinth seal and the primary seal lip. The labyrinth seal restricts exchange of lubricant between the seal lubricant cavity and a lubricant-bearing cavity of a bearing element with which the seal is used. The three resilient seal lips limit ingress of contaminants into the seal cavity. The outermost excluder lip has an increased surface area in contact with the sealing surface of the second seal case.

7 Claims, 3 Drawing Sheets

SEAL ASSEMBLY

BACKGROUND OF THE INVENTION

1. Field of the Invention

This invention relates to a unitized seal assembly of the type used for retaining lubricating grease or oil in a sealed bearing assembly and more particularly to such a seal assembly especially suitable for medium and heavy duty applications such as truck wheel bearings or the like where retaining adequate lubrication in the bearing and excluding foreign matter from the bearing lubrication over long periods of time in adverse operating conditions is critical.

2. Description of the Prior Art

Unitized bearing seals are well known and have been used widely in a variety of applications. Such seals are especially well adapted for use in connection with rail car wheel bearings, truck, trailer and bus wheel bearings, and shaft or wheel bearings for heavy machinery and equipment generally. Seal assemblies of this type normally employ a casing including a first rigid metal case ring structure carrying an elastomeric sealing element and a second rigid metal case ring providing a sealing surface contacted by the sealing element to form the primary lubricant seal.

It is well known that the ingress of contaminants, especially dust or grit and water, past a primary seal lip into the bearing lubricant can and frequently does result in bearing failure even though the bearing cavity contains an adequate volume of lubricant. Also, it is known that dirt or grit in contact with the primary seal can cause excessive seal wear which, in turn, can result in seal leakage and ultimate bearing failure. To overcome these problems, bearing seals conventionally employ a secondary or dust seal for excluding dust, grit, water and other foreign matter from contacting the primary lubricant seal. An example of a bearing seal including a primary sealing lip in contact with a seal surface on a seal case ring and a secondary or dust seal lip outboard of the primary seal lip also contacting the case ring seal surface can be found in U.S. Pat. Nos. 5,186,548; 4,432,557; and 4,106,781.

Seals are also known in which the elastomeric body forming the primary seal lip is formed to include lubricant slingers to act as pumping surfaces and reduce the pressure and/or volume of lubricant coming into contact with the primary seal lip. An example of such a seal may be found in U.S. Pat. No. 4,770,548. While such seals may be effective particularly for use in bearings lubricated with oils, they can produce excessive turbulence and increase lubricant temperature in the vicinity of the seal lip.

Labyrinth seals are also known. In such seals, as disclosed for example in U.S. Pat. No. 5,975,533, the radial thicknesses of thin annular gaps are generally such as to preclude the passage of grease-type lubricants therethrough during operation of the bearing.

In recent years, there has been an increased demand for bearing seals capable of reliably performing the sealing function over longer periods of time. This is particularly true, for example, in the trucking industry where in the past, it became standard practice to change the wheel bearing seals during each brake job. Even through the bearing seals may still have been doing their job effectively, the relatively low cost of individual seals and the danger of damage to a seal in removing and reinstalling the seal and the consequent bearing failure, replacing the seals with each brake job was considered economically sound. However, heavy-duty over-the-road trucks today make broad use of outboard mounted brakes, making it possible to complete a brake job without disturbing the bearing seals. Further, improved brake designs and materials have greatly increased the effective life of truck wheel brakes so that extended seal life is required even though some truck fleet operators may continue to follow the established practice of replacing seals at every brake reline. Thus, a long-life wheel bearing seal which will reliably and effectively maintain a seal, not only keeping the lubricant in the bearing but also excluding foreign materials, through the life of two or more brake linings is desired.

For a seal to reliably achieve such an extended life, it is not only critical that an adequate lubricant supply be maintained in the bearing, but it is particularly critical that foreign matter such as dirt, dust, road salt, water and other contaminants be excluded from the bearing lubricant since such contamination can cause bearing wear and failure when present even in very small quantities.

Accordingly, it is a primary object of the present invention to provide an improved bearing seal suitable for use in wheel bearings and the like. Preferably, the bearing is effective in sealing the bearing for extended periods of time. Another object is to provide such a seal which is efficient in maintaining the bearing lubricant in the bearing cavity and in excluding foreign material from the bearing.

SUMMARY OF THE INVENTION

In one aspect, the present invention provides a seal assembly for mounting on a shaft comprising a first ring-shaped seal case, a second ring-shaped seal case, and a ring-shaped elastomer body carried by the first seal case. The first and second seal cases and elastomer body have a central longitudinal axis. At least two of the first seal case, second seal case and elastomer body define a seal cavity. Portions of at least two of the first seal case, second seal case and elastomer body define a labyrinth seal radially spaced from the seal cavity. At least part of the second seal case is radially outward of the elastomer body and first seal case. The elastomer body includes a plurality of lips in contact with the second seal case at a position radially spaced from the seal cavity. At least part of the seal cavity is positioned between the labyrinth seal and the lips of the elastomer body. The labyrinth seal includes more than one axially directed gap.

In another aspect, the present invention provides a seal assembly for mounting on a shaft comprising a first ring-shaped seal case, a second ring-shaped seal case, and a ring-shaped elastomer body carried by the first seal case. The first and second seal cases and elastomer body have a central longitudinal axis. At least two of the first seal case, second seal case and elastomer body define a seal cavity. Portions of at least two of the first seal case, second seal case and elastomer body define a labyrinth seal radially spaced from the seal cavity. At least part of the second seal case is radially outward of the elastomer body and first seal case. The elastomer body includes a plurality of lips in contact with the second seal case at a position radially spaced from the seal cavity. At least part of the seal cavity is positioned between the labyrinth seal and the lips of the elastomer body. The labyrinth seal includes at least one axially directed gap and the elastomer body includes an axially directed lip defining part of the axially directed gap.

In another aspect, the present invention provides seal assembly for mounting on a shaft comprising a first ring-shaped seal case, a second ring-shaped seal case, and a ring-shaped elastomer body carried by the first seal case. The first and second seal cases and elastomer body have a central longitudinal axis. At least two of the first seal case, second seal case and elastomer body define a seal cavity. Portions of at least two of the first seal case, second seal case and elastomer body define a labyrinth seal radially spaced from the seal cavity. At least part of the second seal case is radially outward of the elastomer body and first seal case. The elastomer body includes a plurality of lips in contact with the second seal case at a position radially spaced from the seal cavity. At least part of the seal cavity is positioned between the labyrinth seal and the lips of the elastomer body. The labyrinth seal includes an interface between a radial face of the second seal case and a radial face of the elastomer body. The radial face of the elastomer body includes a plurality of raised chaplet surfaces nearest the radial face of the second seal case, a plurality of recessed surfaces spaced farthest from the radial face of the second seal case and a plurality of joining surfaces joining the raised chaplet surfaces and recessed surfaces. One of the seal cases is rotatable with respect to the other seal case.

In another aspect, the present invention provides a unitized seal assembly for sealing a bearing used to support a housing having a cylindrical bore therein for rotation relative to a journal on a shaft extending coaxially into the cylindrical bore to provide a sealed lubrication chamber for the bearing. The seal assembly comprises a first seal case in the form of a ring having a generally channel shape axial cross section. The first seal case includes a cylindrical mounting body portion terminating at each end in a generally radially extending flange. An elastomer body is carried by the first seal case and is bonded to at least part of the seal case. The elastomer body is molded to provide a primary seal lip spaced radially from the first seal case body portion. The elastomer body also has a pair of dust seal lips spaced axially from the primary seal lip and from one another. The seal assembly also includes a second seal case. The second seal case includes first, second and third radially spaced concentric cylindrical segments. The second and third cylindrical segments are joined at one end of the second seal case by a first generally radially extending portion. This radially extending portion is positioned radially between the radially extending flanges of the first seal case. The first and second cylindrical segments are joined at the other end of the second seal case by a second wall portion including a radially and axially inclined segment. The second cylindrical segment has a cylindrical sealing surface contacting the primary seal lip to define a primary lubrication seal. The inclined wall segment contacts at least one of the first dust seal lip and the second dust seal lip at a location spaced radially from the cylindrical sealing surface. The first seal case body is adapted to be mounted in fluid-tight relation on one of a shaft and a cylindrical recess supported for relative rotation by a bearing. The second seal case is adapted to be mounted in fluid-tight relation with the other of such shaft and cylindrical recess.

In another aspect, the present invention provides a unitary bearing seal mounted between a shaft and a bore in a relatively rotating member supported on the shaft by an antifriction bearing. The seal comprises a first annular seal case, an annular molded elastomer body and a second annular seal case. The first annular seal case has an elongated cylindrical body for mounting in lubrication-tight relation on a shaft. The cylindrical body includes a first radially outwardly extending flange at one end. The annular molded elastomer body is bonded onto at least part of the first seal case body. The elastomer body has integrally molded thereon a radially outwardly directed primary seal lip and at least one outwardly directed dust seal lip spaced axially from the primary seal lip. There is an axially extending, generally cylindrical groove defined at least in part by the elastomer body. The groove is positioned at a location spaced radially inward from the primary seal lip. The groove terminates in a generally radially extending end wall. The second annular seal case has a generally cylindrical mounting surface mounted in lubrication-tight relation in the bore of the relatively rotating member. The second seal case includes a generally cylindrical segment having a radially inward directed sealing surface contacting and forming a seal with the primary seal lip, and a generally cylindrical leg concentric with and spaced radially inward from the sealing surface and radially outward from the first seal case body. The leg extends into the annular groove and terminates in a generally planar, substantially radially extending end face. At least the leg of the second seal case and the groove cooperate to define a labyrinth seal. The second seal case further includes a generally radially extending wall joining the cylindrical segment and the leg, and another segment joining the cylindrical segment and the mounting surface. At least two of the first seal case, second seal case and elastomer body cooperate to define an annular seal lubricant cavity sealed by the primary seal lip and the labyrinth seal. The first seal case includes a substantially radially extending flange on the elongated cylindrical body opposite the first flange to maintain the seal in a unitized configuration. The leg of the second seal case is positioned between the flanges of the first seal case. The dust seal lip contacts at least one of the surfaces of the second seal case.

BRIEF DESCRIPTION OF THE DRAWINGS

The invention will be described in conjunction with the attached drawings, in which like reference numbers are used for like parts and in which.

DETAILED DESCRIPTION

Figure 1:
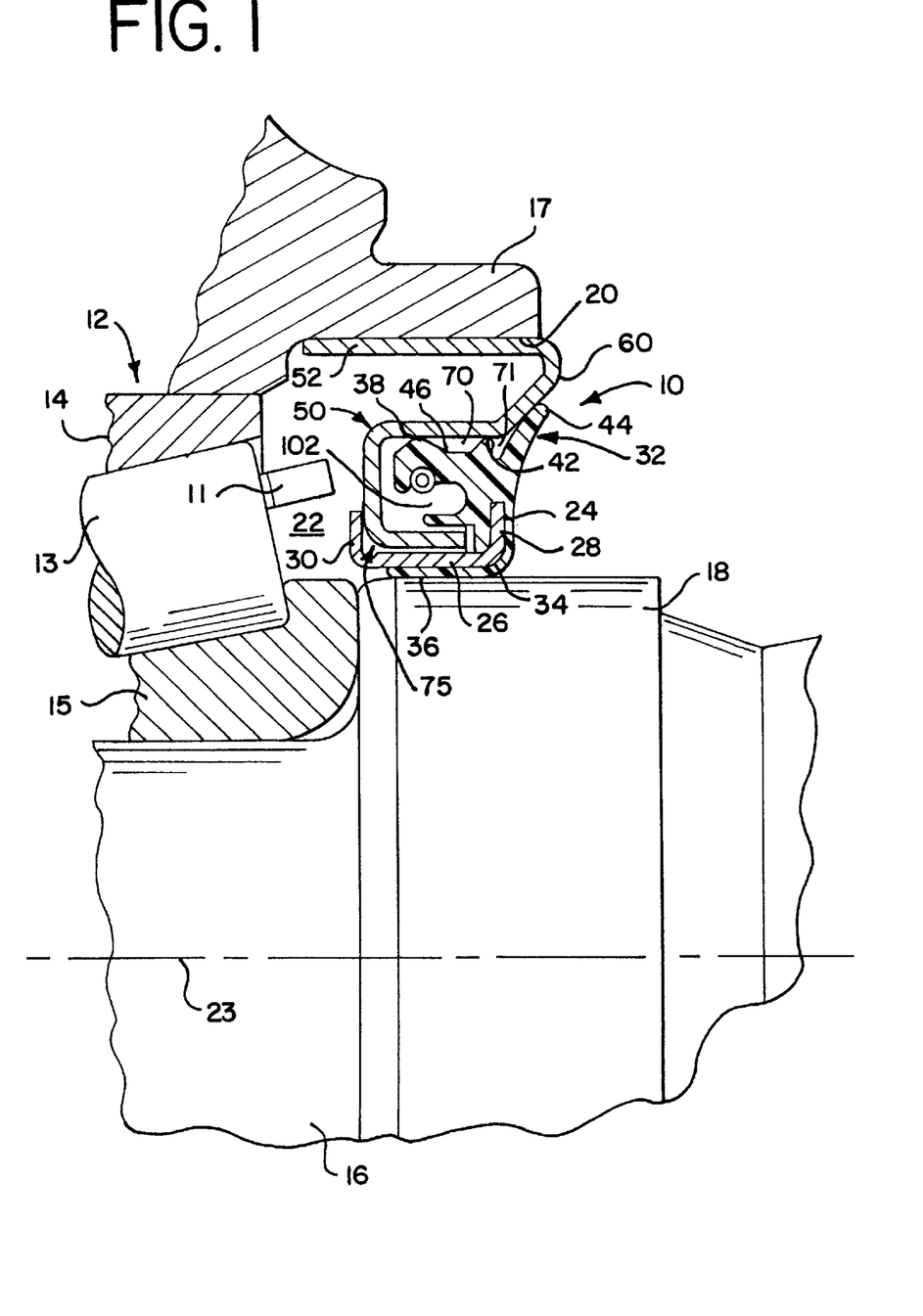
FIG. 1 is a fragmentary sectional view of a unitized seal according to the invention shown installed between a stationary wheel axle or journal and a bearing supported rotary hub.

Referring now to the drawings in detail, a unitized bearing seal assembly embodying the present invention is indicated generally by the reference number 10. The unitized bearing seal 10 is illustrated in FIG. 1 as used with an antifriction bearing assembly 12. The antifriction bearing assembly 12 including a caged roller assembly supported between inner and outer races 14, 15, respectively. The caged roller assembly includes rollers 13 and a cage 11. The antifriction bearing assembly 12 is shown mounted on a fixed wheel journal 16 of a shaft or axle for supporting a rotary wheel hub. The seal assembly 10 is supported between a cylindrical shoulder 18 on the axle adjacent journal 16 and a cylindrical bore 20 of hub 17 in position to provide a seal for lubricant contained within the bearing lubricant cavity indicated generally at 22. The seal assembly 10, bearing assembly 12, and journal 16 of the axle share a central longitudinal axis shown at 23 in FIG. 1. Axis 23 is the axis of rotation of the hub 17 in the illustrated truck bearing, hub and journal assembly.

The seal assembly 10 is of unitized construction and comprises a first, rigid, ring-shaped seal case member 24 preferably stamped from steel sheet and including a cylindrical, central body portion 26. The first seal case member 24 has a first outwardly directed flange 28 at one end of the central body portion 26 and a second outwardly directed flange 30 at its other end. The first seal case 24 shares the central longitudinal axis 23 of the journal 16. Both flanges 28, 30 extend radially outward away from the central longitudinal axis 23 of the journal 16.

In the illustrated embodiment, the first outwardly directed flange 28 comprises a stiffener flange and the second outwardly directed flange 30 comprises a unitizing flange. The flanges 28, 30 and central body portion 26 are integral. The stiffener flange 28 is formed first, and after the two seal cases have been assembled, the unitizing flange 30 is formed.

In the illustrated embodiment, the axial distance between the outer surfaces of the flanges 28, 30 is 0.48 inches. It should be understood that this and other dimensions set forth in this description are provided by way of example only, and that the present invention is not limited to any particular dimension unless other dimensions are expressly excluded from the claims.

A body 32 of resilient, elastomeric sealing material is molded onto and bonded to at least part of the first seal case 24. In the illustrated embodiment, the seal case flange 28 projects into the elastomer body 32 to stiffen the elastomer body 32. The elastomer body 32 may extend over stiffener flange 28 and along the radial inner surface 34 of the first seal case body 26, as shown at 36 in FIG. 2. As seen in FIG. 1, the inner cylindrical surface 34 of the first seal case 24 has a diameter slightly greater than the diameter of shoulder 18, and the thickness of the elastomer coating 36 is dimensioned to be slightly compressed when telescoped onto the surface of the shoulder 18 to accurately position the seal case 24 concentrically with the axis 23 of journal 16 and to provide an interference-fitted lubricant-tight seal therewith in a manner known in the art.

The elastomer body 32 is preferably of a synthetic rubber material, or a mixture of synthetic rubbers such as neoprene or nitrile rubber or other oil resistant elastomers which will hereinafter be simply referred to as rubber or elastomer. It should be understood that the present invention is not limited to any particular material for the elastomer body unless expressly set forth in the claims.

It should also be understood that the layer 36 of elastomer coating the inner surface 34 of seal case body 36 may be eliminated, with the surface 34 fitting, in interference relation, directly onto the surface of shoulder 18 to accurately align the seal case with the axis 23 of journal 16.

As most clearly seen in FIG. 2, the resilient elastomer body 32 is molded to include a conventional primary sealing lip 38 which may be resiliently urged, as by spring 40, in an outward direction to provide positive sealing contact with the sealing surface in the manner described below. Seal lip 38 may also be provided with one or more hydrodynamic pumping surfaces, not shown, as is known in the art. A pair of dust seal lips, including a secondary lip 42 and an excluder lip 44, are also integrally molded on the resilient rubber body 32. The secondary lip 42 and an excluder lip 44 are spaced axially from each other and from the primary sealing lip 38, and extend generally radially outwardly from the body of the elastomer body 32. The surface 46 between the primary lip 38 and secondary lip 42 is contoured to provide a concave surface; thus, a generally accurate channel or pre-lube groove 49 is provided between the dust seal lips 42, 44.

Seal assembly 10 also includes a second rigid ring-shaped seal case member 50. The second seal case member 50 has a first cylindrical outer rim or leg segment 52, an intermediate cylindrical leg segment 54 spaced radially inward from leg 52 and a third cylindrical axially-extending leg segment 56 spaced radially inward from leg 54. Outer cylindrical leg 52 is integrally joined with leg 54 by a transition ring 58 having a generally conical configuration presenting an outer seal surface 60 radially and axially inclined with respect to axis 23 of journal 16 and to the cylindrical legs 52, 54. The angle of inclination of surface 60 is preferably within the range of about 30° to about 75° relative to the axis of rotation, i.e. the journal axis 23, although as explained below the exact angle is not critical to the invention. This angle is shown at $\alpha$ in FIG. 2.

Cylindrical segments 54 and 56 are also integrally joined by a substantially radially extending wall portion 62 so that the outer seal case, in cross-section, is of a generally z-shaped or s-shaped configuration, made up of a series of generally straight line segments. The leg 56 has its radially inner cylindrical surface 64 extending in closely spaced concentric relation with the opposed cylindrical outer surface 66 of the body 26 of the inner seal case 24, with the unitizing flange 30 of the inner seal case 24 extending in closely spaced overlapping relation to the radial wall 62 of the outer seal case 50. The unitizing flange 30 of the first seal case and the radial wall 62 of the second seal case retain the seal in the assembled or unitized configuration when the seal is assembled onto or disassembled from the hub. The unitizing flange 30 has a thickness of about half the thickness of the stiffener flange 28 and central body portion 26 of the seal case 24; these thicknesses are 0.025 for the unitizing flange 30 and 0.05 inches for the stiffener flange 28 and seal case body 26 in the illustrated embodiment. All parts of the second seal case 50 have thicknesses of 0.05 inches in the illustrated embodiment. In practice, the unitizing flange 30 is initially formed as a straight cylindrical extension of the body 26 of seal case 24 and deformed to the radial condition after assembly with the outer seal case 50 in a manner known in the art. Once the unitizing flange 30 is deformed, the seal is unitized: the two seal cases 24, 50 will not separate under normal conditions.

In the assembled relation, the concave contoured surface 46 or groove 48 of the elastomer body 32 cooperates with the primary lubrication seal lip 38, the secondary dust seal lip 42, and the cylindrical sealing surface 68 of the outer seal case 50 to define an annular cavity 70. The annular cavity 70 may be filled or partially filled with lubricant either before or during assembly. Similarly, the secondary dust seal lip 42, excluder lip 44 and sealing surfaces 60, 68 of the outer seal case 50 cooperate to define an annular cavity 71 that may be filled or partially filled with lubricant before or during assembly. The purpose of providing such lubricant is explained below.

In addition to the sealing lips 38, 42, 44, the elastomer body 32 is molded with an axially extending annular lip 72. As shown in FIG. 2, this axial lip 72 extends in parallel to the body 26 of the first seal case 24; the axial lip 72 and body 26 are spaced apart to define an annular, axially-extending groove 76 into which the free or terminal end of cylindrical leg 56 of the second seal case 50 extends.

Figure 2:
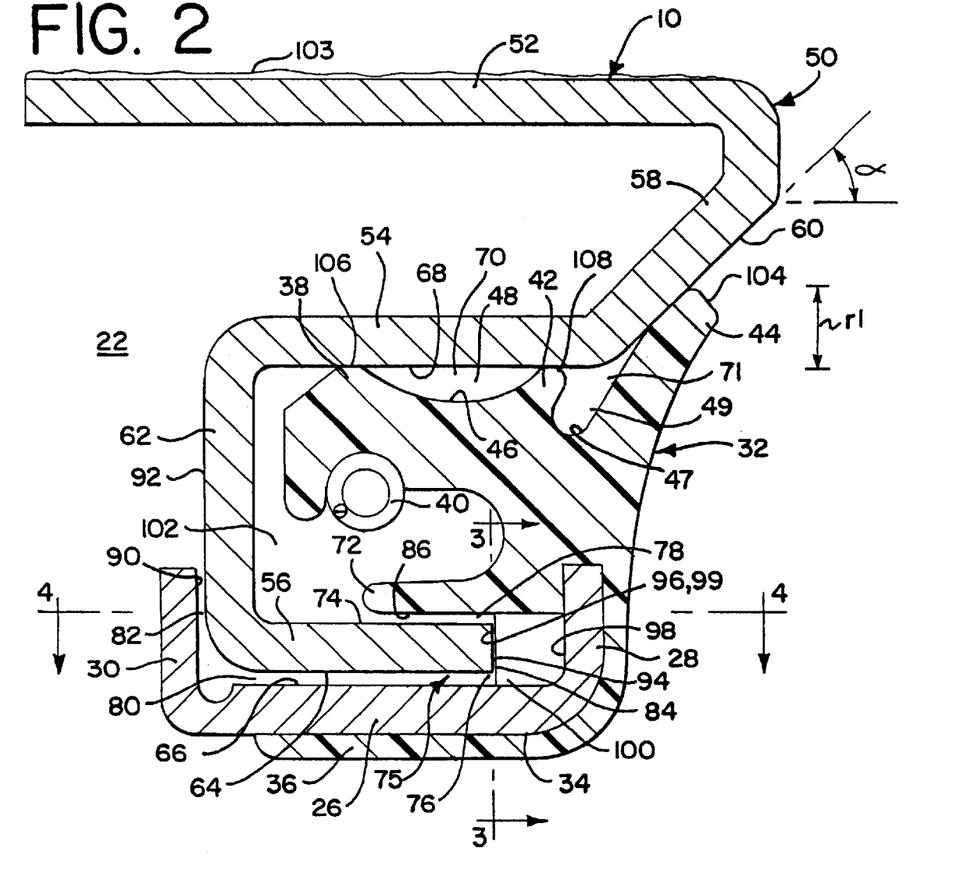
FIG. 2 is an enlarged sectional view of the seal shown in FIG. 1.

Together, the elastomer body 32, body 26 and unitizing flange 30 of the first seal case 24, and cylindrical leg 56 and part of the radial wall 62 of the second seal case 50 define a labyrinth seal, generally designated 75 in FIG. 2. The illustrated labyrinth seal 75 includes a plurality of spaced axially directed gaps 78, 80 and radial gaps 82, 84. All of the gaps 78, 80, 82, 84 defining the labyrinth seal 75 are annular and are in fluid communication. One axial gap 78 of the labyrinth seal 75 is defined by a radially inward directed surface 86 of the elastomer lip 72 and a closely-spaced radially outward directed surface 74 of the leg 56 of second seal case 50. The other axial gap 80 of the labyrinth seal 75 is defined by the closely-spaced radial inward directed surface 64 of the leg 56 of the second seal case 50 and the radially outward directed surface 66 of the body 26 of the first seal case 24. One radial gap 82 is defined by the closely spaced radially oriented surfaces 90, 92 of the unitizing flange 30 of the first seal case 24 and the wall 62 of the second seal case 50. This radial labyrinth gap 82 leads from the bearing lubricant cavity 22 to the axial labyrinth gap 80. The axial labyrinth gap 80 is connected to the other axial labyrinth gap 78 by the radial gap 84. The annular radial gap 84 is defined by a terminal end face 94 of the leg 56 of the second seal case 50 and the radial end or bottom wall 96 of the groove 76.

Figure 3:
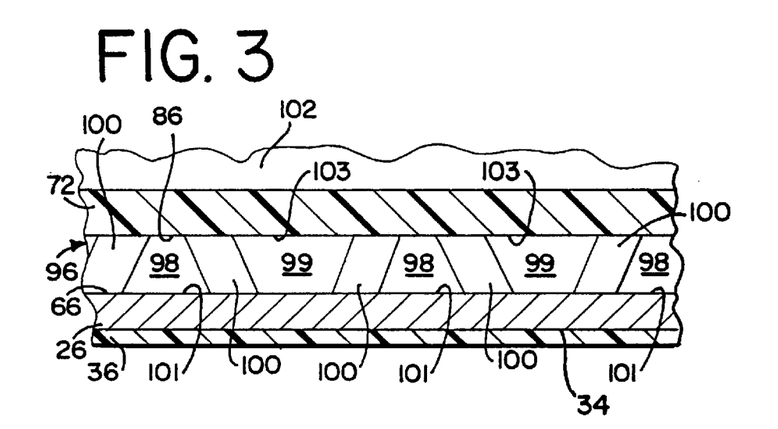
FIG. 3 is a fragmentary sectional view taken along line 3—3 of FIG. 2.
Figure 4:
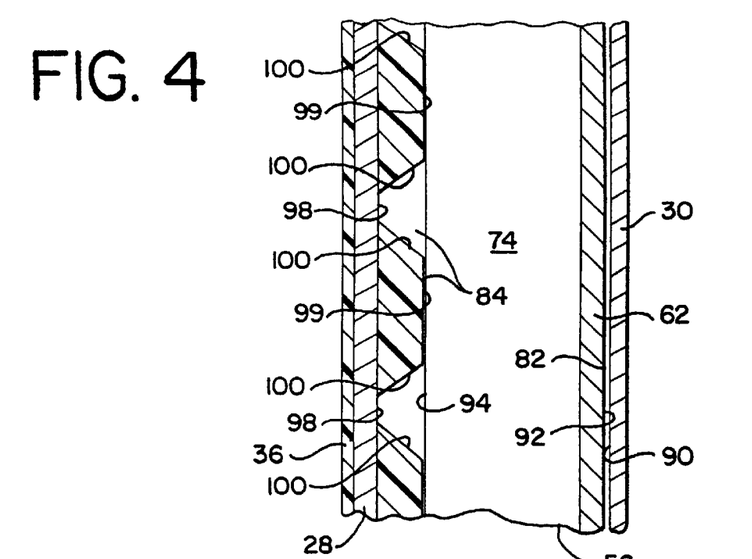
FIG. 4 is a fragmentary sectional view taken along line 4—4 of FIG. 2.

As shown in FIGS. 3–4, the radial end wall 96 of the groove 76 is formed with a series of chaplets. The chaplets are defined by axially recessed bottom surfaces 98; these recessed surfaces are spaced axially farther from the free end face 94 of the leg 56 than raised surfaces 99 of the end wall 96. The recessed surfaces 98 are joined to the raised surfaces 99 by inclined surfaces or wall portions 100; the raised surfaces 99 and inclined surfaces 100 form a series of chaplets around the periphery of the groove 76. In the first illustrated embodiment, the depths of the chaplets are 0.075 inches.

As shown in FIG. 3, the recessed surfaces 98 are wedge shaped and preferably have a greater circumferential dimension at their radial inner ends and are tapered: the recessed surfaces 98 are generally isosceles trapezoidal surfaces. The non-recessed or raised surfaces 99 of the chaplets are also generally isosceles trapezoidal surfaces, but are reversely oriented, with their greatest circumferential dimension at their radial outer ends. The surfaces 98 and 99 are joined by the inclined surfaces or wall segments 100. This arrangement provides a slightly greater volume between the chaplets at their radially inner portion to thereby provide a slightly greater urging action tending to expel lubricant radially inward.

It should be understood that although in the illustrated embodiment there is a slight spacing between the raised chaplet surfaces 99 and the end face 94 of leg 56, the end face 94 of leg 56 can be positioned directly against the resilient raised chaplet surfaces 99. Moreover, when assembling the first and second cases 24, 50, the end face 94 of leg 56 will be positioned against the raised chaplet surfaces 99 to properly position the seal cases 24, 50. At this stage, the radial labyrinth gap 84 would be between the recessed surfaces 98 and the end face 94 of leg 56. After some initial period of use, it can be expected that the raised chaplet surfaces 99 would wear somewhat, leaving a small gap as shown in FIG. 4. After such wear, the radial gap would include both the gap between the surfaces 94 and 99 and the gap between the surfaces 94 and 98.

In the illustrated embodiment, the raised chaplet surfaces 99 of the radial end wall 96, recessed surfaces 98 and inclined joining surfaces 100 are formed in the elastomeric body 32. It should be understood that although the illustrated embodiment employs such surfaces, the invention is not limited to the use of such chaplets unless expressly set forth in the claims. In addition, although the chaplets are formed in the elastomer body 32 in the illustrated embodiments, it may be possible to use other hydrodynamic shapes and designs and any of such hydrodynamic shapes and designs could be formed in another element. However, as discussed in the preceding paragraph, it is advantageous that the end wall 96 be formed of an elastomer: when installed, the end face 94 of the leg 56 of the second seal case 50 can be placed directly against the outermost surfaces 96 of the wall; although there may be some wear at this interface with use, wearing of the elastomer surfaces 96 should not adversely affect the efficiency of the labyrinth seal 75.

Radially outward of the labyrinth seal 75 are three seals formed between the lips 38, 42, 44 of the elastomer body 32 and wall surfaces 60, 68 of the second seal case 50. The excluder or dust seal lip 44 may be initially molded to extend in a substantially outward radial direction. When the seal is assembled, the seal excluder lip 44 is slightly deflected axially by contact with the inclined sealing surface 60 of the second seal case 50. The resilience of the synthetic rubber material of which the excluder lip 44 of the elastomer body 32 is molded provides a light, rubbing sealing contact with the surface 60. As shown in FIGS. 1–2, the excluder lip is elongated compared to the other lips 38, 42, and preferably contacts the surface 60 over an annular area, rather than a circular contact. The larger surface area of contact should provide better sealing against contaminants. Also, the rotating second seal case 50 tends to sling dirt, water and other contaminants away from the sealing surface during operation, and the inclined overhanging portion of surface 60 acts as a shield for the resilient excluder lip 44.

In the illustrated embodiment, the area of contact between the excluder lip 44 and the radially and axially inclined seal case surface 60 is greater than the area of contact between the secondary seal lip 42 and the seal case surface 68, and greater than the area of contact between the primary seal lip 38 and the seal case surface 68. Thus the greatest area of contact between the elastomer body and the second seal case is at the seal exposed to the environment. This increased surface area for the outermost seal lip should provide increased protection against the ingress of contaminants at this first line of resistance.

In addition, the radial distance from axis 23 to the radially outer point of contact between the excluder lip 44 and the seal case surface 60 is greater than the radial distance from the axis 23 to the radially inner contact point. Accordingly, when the seal case 50 is rotating, the surface speed at the radially outer interface of the excluder lip 44 and seal case surface 60 is greater that the surface speed at the radially inner interface of the excluder lip 44 and seal case surface 60. This speed differential creates a pressure differential: since the surface speed is greater at the outer point, pressure is greater at the inner contact point than at the outer contact point. This pressure differential tends to exclude contaminants from passing from the environment past the excluder lip 44 to the cavity 71.

In the illustrated embodiment, the excluder lip 44 is also substantially longer than the secondary seal lip 42 and the primary seal lip 38. The radial distance, shown at r1 in FIG. 2 between the end 104 of the excluder lip 44 and the ends 106, 108 of the primary and secondary lips 38, 42 is about 3/32 inches. It should be understood that this distance is provided by way of example only, and that the present invention is not limited to this distance unless expressly set forth in the claims.

The radially outer part of the excluder lip 44 in contact with the inclined surface 60 is bent at the angle of the surface 60. The angle α of the surface 60 of the seal case 50 defined with the axis 23 of rotation of the seal case 50 may vary depending upon a number of factors including the size or radial dimension of the seal, the resilience of the synthetic rubber body 32, and the ambient conditions under which the seal may be expected to perform. This angle may vary from about 30° to about 75°, and under most conditions will be between about 40° and about 70°. In the illustrated embodiment, this angel α is about 45°.

The secondary sealing lip 42 is intended to provide light rubbing or sealing contact with the surface 68 of the second seal case 50. The seal lip 42 is spaced axially from the excluder lip 44 toward the seal cavity 102. The distance between the lips 42, 44 provides a substantial void 71. This void 71, as well as the void 70, will normally be filled, or at least partially filled, with lubricant upon assembly of the seal. These volumes of lubricant not only provide lubrication for the seal lips 38, 42, 44, but also act to effectively trap any minute quantities of contaminant that might find their way past the seal lips 42, 44 during the life of the seal.

In addition to the void 71 between the excluder lip and secondary lip, and the void 70 between the secondary lip 42 and primary lip 38, the present invention provides a third cavity through which a contaminant must pass before reaching the labyrinth seal, which the contaminant must traverse to reach the bearing lubricant cavity 22. As shown in FIGS. 1–2, when the two seal cases 24, 50 and elastomer body 32 are assembled, a seal cavity 102 is defined. The seal cavity 102 is between the labyrinth seal 75 and primary seal lip 38, and is enclosed by the elastomer body 32 and second seal case 50. The seal cavity 102 may be filled with a lubricant to provide lubrication to the primary seal lip 38 of the elastomer body 32.

The lubricants used in the seal lubricant cavity 102 and bearing lubricant cavity 22 should not intermingle in the illustrated embodiment of the present invention to any detrimental effect. Generally, a grease lubricant, such as Mobil ® 220 grease, will preferably be used in the bearing lubricant cavity 22, and the labyrinth seal 75 and pumping action of the chaplets should prevent any substantial migration of the grease lubricant to the seal lubricant cavity 102. A compatible lubricant of different characteristics can be used in the seal lubricant cavity 102. For example, a less viscous oil lubricant can be used in the seal lubricant cavity 102 to lubricate the lip 38 of the elastomer body 32 to minimize wear and reduce heat. However, it should be understood that the invention is not limited to the use of any particular type of lubricant in either lubricant cavity 22 or 102 or in cavities 70, 71.

With the hydrodynamic pumping action provided by the surfaces 98, 100 between the raised chaplet surfaces 99, migration of the seal lubricant from the bearing lubricant cavity 22 through the labyrinth seal 75 should be eliminated or substantially reduced: any lubricant passing through the axial labyrinth gap 80 and entering the recesses 98 of the radial labyrinth gap 84 should be deflected back into the gap 80. In addition, lubricant in the seal lubricant cavity 102 will tend to be thrown radially outward away from the labyrinth seal 75 by centrifugal force during operation, particularly at a relatively high RPM, thereby helping to maintain the seal lubricant in the seal lubricant cavity 102 between the labyrinth seal 75 and the primary seal lip 38.

The gaps 78, 80, 82, 84 of the labyrinth seal 75 are preferably small enough to substantially prevent the flow of bearing lubricant therethrough, and thus seal the bearing and lubricant. In addition, the gaps 78–84 are preferably small enough to substantially prevent the migration of seal lubricant through the labyrinth to the bearing lubricant cavity 22. The dimensions of the gaps 78–84 may vary depending on the bearing lubricant and seal lubricant used. It should be understood that the sizes of the gaps are exaggerated in the drawings for purposes of illustration. The actual distances between the opposing surfaces defining the gaps will depend upon the nature and characteristics of the lubricants employed in the lubricant cavities 22, 102, and will be such as to effectively restrict the flow of lubricant from either chamber from passing through the labyrinth during relative rotation of the seal cases 24, 50 and during the static condition. One can expect that the total length of the gaps 78–84 should be at least about three times the width of one of the gaps 78–84 for the seal to operate as a labyrinth seal. And as pointed out above, the hydrodynamic pumping action at the interface between surfaces 94 and 96 of the labyrinth seal 75 should assist in limiting the migration of material from bearing lubricant cavity 22 to seal lubricant cavity 102.

It should be understood that the shapes of the gaps defining the labyrinth seal can be varied from those shown. For example, instead of parallel opposing surfaces 86, 74 defining the axially-directed gap 78, the distance between the opposing surfaces 86, 74 may vary, with the most narrow distance being near the radial end gap 84 and the widest distance being the opposing surfaces 86, 74 at the end of the lip 72. To achieve these spacings, the surfaces 86, 74 may be tapered to converge toward each other from the lip 72 to the radial gap 84, or on the surfaces 86, 74 may be tapered and the other maintained in the illustrated shape. Similarly, instead of parallel opposing surfaces 64, 66 defining the axially-directed distance between the opposing surfaces 64, 66 may vary, with the most narrow distance being near the radial end gap 84 and the widest distance being between the opposing surfaces 64, 66 at the radial gap 82. To achieve these spacings, the surfaces 64, 66 may be tapered to converge toward each other from the radial gap 82 to the radial gap 84, or one of the surfaces 64, 66 may be tapered and the other maintained in the illustrated shape. In any event, the surfaces 64, 66, 74, 86 and gaps 78–84 may be shaped to create speed and pressure differentials to urge seal lubricant toward the seal lubricant cavity 102 and bearing lubricant toward the bearing lubricant cavity 22.

When the seal assembly 10 of FIGS. 1–4 is installed on a hub and axle, the outer leg 52 of second seal case 50 may be received in interference relation within the cylindrical bore 20 in the rotating hub 17 so that the second seal case 50 rotates with the hub about the axis 23 of the normally stationary shoulder 18 of journal 16. Alternatively, it may be desirable to provide a coating of tacky sealing material shown at 103 in FIG. 2 on the outer surface of the leg 52 of the seal case. Such a tacky coating will assist in preventing outward migration of lubricant and inward migration of contaminants at the interface of the leg 52 and hub 17. Any standard material may be used and may be applied in a standard manner, such as by spray coating a rubber material.

When the seal assembly 10 is installed on a hub or axle, the radially inward surface 34 of the body portion 26 of the first seal case 24 or the layer of elastomer 36 is received in interference relation with the outer cylindrical surface of the shoulder 18 of the axle journal 16 so that the first seal case 24 remains stationary with the axle. Since the elastomer body 32 is vulcanized to the first seal case 24, the elastomer body 32 1so remains stationary with the first seal case 24 and the axle. Thus, as the hub 17 rotates, the stationary lips 38, 42, 44 of the elastomer body 32 rub and seal against the rotating surfaces 60, 68 of the rotating second seal case 50. Lubricant in the cavities or chambers 70, 71, 102 lubricate he seal lips 38, 42, 44. The excluder lip 44 should exclude substantially all contaminants from entering the cavity 71. If any contaminants enter cavity 71, they should be excluded from cavity 70 by the secondary sealing lip 42. If any contaminants enter cavity 70, they should be excluded from seal lubricant cavity 102 by the primary sealing lip 38. If any contaminants enter seal lubricant cavity 102, they should be excluded from the bearing lubricant cavity 22 by the labyrinth seal 75. Loss of bearing lubricant from the bearing lubricant cavity 22 should be minimized by the operation of the labyrinth seal 75 and the hydrodynamic urging of the surfaces 98, 100 between the raised chaplet surfaces 99.

Figure 5:
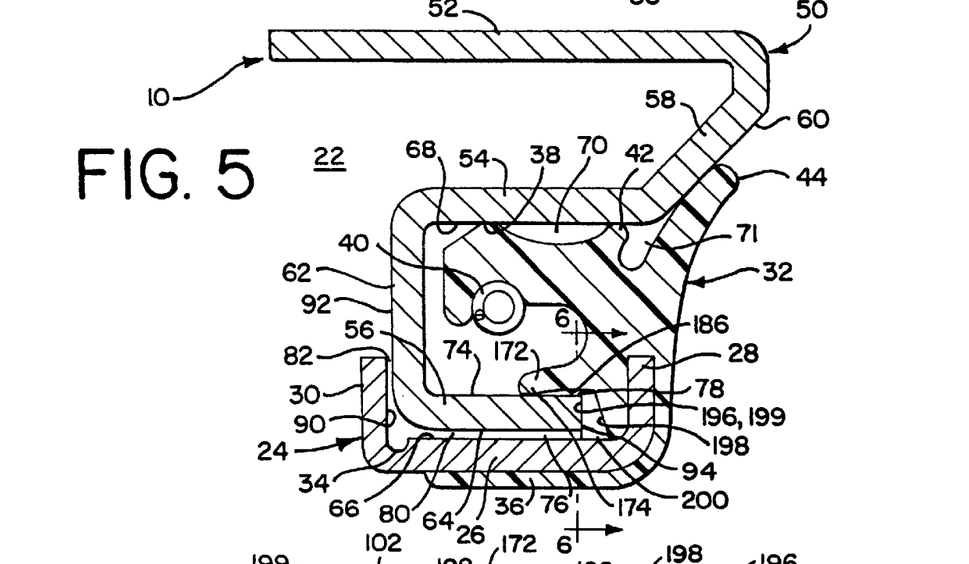
FIG. 5 is a view similar to FIG. 2 and showing an alternative embodiment of the invention.
Figure 6:
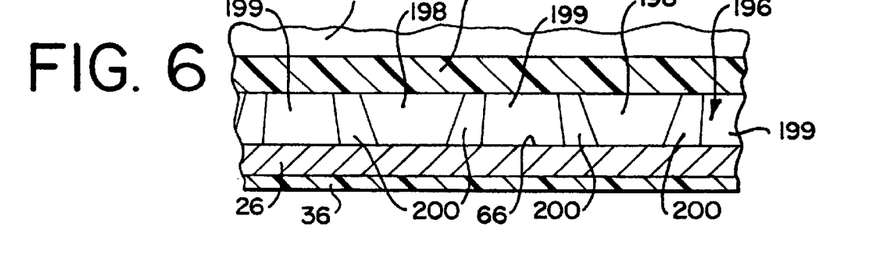
FIG. 6 is a sectional view taken along line 6—6 of FIG. 5.

Variations of the first illustrated embodiment are possible. Alternative embodiments are shown in FIGS. 5 and 6. With a seal such as that shown in FIG. 5, the flow of lubricant between the lubricant cavities 22, 102 through to the labyrinth seal 75 may be more positively prevented. Such a design may be useful in the event a less viscous lubricant is employed in the bearing or when an oil lubricant is employed in both the bearing and seal cavities. In these embodiments, the first and second seal cases are identical to that described above, as is the molded rubber element with the exception of the portion thereof forming the labyrinth seal. Accordingly, like reference numbers have been used to designate corresponding components of the embodiment previously described and the modified embodiments of FIGS. 5 and 6 with the exception of the resilient rubber components defining the labyrinth seal.

Referring first to FIG. 5, it is seen that the molded rubber labyrinth seal lip 172 terminates, at its free end, in a radially-inward curved portion 174 positioned to engage and provide a light rubbing contact with the surface 74 of the leg 56 of the second seal case 50. This light rubbing contact provides further assurance against the seeping of lubricant through the labyrinth seal either during operation or in a static condition, particularly when low viscosity oil is used. Preferably, this rubbing contact is as slight as can be maintained within normal manufacturing tolerances so that essentially no rolling resistance is provided by this contact.

The chaplets formed in the bottom or end 196 of the labyrinth groove 76 are also designed in this embodiment to present a greater depth at their radially inward end adjacent to the surface 66 of the first seal case body 26. Thus, as shown in FIG. 6, the radial face portion of the bottom or end 196 of the groove 76 is divided into a series of raised end wall chaplet surface segments 198 approaching a rectangular configuration while the recessed surfaces 199 are in a substantially isosceles trapezoidal configuration with the inclined side surfaces 200 of the recesses being wider adjacent to the surface 66 than at their radially outer portions adjacent molded lip 172. This increased depth provides an increased hydrodynamic or pumping function tending to urge seal lubricant back toward the bearing lubricant cavity 22. Thus, the chaplets of this embodiment of the invention, in combination with the rubbing contact of lip 172, provide greater resistance to lubricant exchange between the lubricant cavities 22 and 102. It should also be noted that the lip 172 in the embodiment of FIGS. 5–6 may be shorter than the lip 72 of the embodiment of FIGS. 1–4. It should be understood that either feature of the embodiment of FIGS. 5–6 may be employed together as illustrated or one without the other.

The use of either embodiment of the invention should result in a substantial reduction or elimination of fluid exchange between the bearing lubricant cavity 22 and the area within the vicinity of the primary seal lip 38. Thus, the present invention should provide enhanced assurance against contamination reaching the bearing and thereby enables operation of the seal over greatly extended periods of time. Further, the illustrated seals enable use of different, though compatible, lubricants in the seal and bearing. Thus, the chances of the seal becoming starved of lubricant, particularly when used with a bearing arrangement in which a heavy grease type lubricant is employed or when operating in very cold climates, is substantially reduced or eliminated by using a lighter weight oil type lubricant in the seal cavity; with such a lighter weight lubricant in the seal cavity, lubrication of the rubbing contact surfaces of the rubber seal lips and the sealing surfaces of the second seal case can be assured.

To make the seal assembly 10 of the present invention, the combination of the first seal case 24 and elastomer body 32 may first be made. Generally, the seal case 24 may be initially stamped from metal, and then the stiffener flange 28 may be formed by known cold-forming techniques. The portion that will eventually define the unitizing flange 30 and the seal case body 26 may be cylindrical. The elastomer body 32 may be formed and bonded to the seal case 24 by standard molding techniques, including injection molding, compression molding and compression transfer molding. For compression molding, the seal case 24 may be supported by mold structures and pushed into an elastomer prep on the mold. To strip the molded combination seal case and elastomer body from the mold, parts of the mold may be spaced to provide space for the excluder lip 44 to flex as the part is stripped from the mold without damaging the part.

The second seal case 50 may be stamped from steel sheet and then cold-formed to the illustrated shape.

After the combination elastomer body 32 and first seal case 24 are removed from the mold, the first and second seal cases 24, 50 may be assembled by inserting the leg 56 of the second seal case 50 into the groove 76 between the axial lip 72 and seal case body 26. The two seal cases 24, 50 are pushed together until the end face 94 of the seal case leg 56 is positioned against the raised chaplet surfaces 99 of the elastomer body 32. The second or unitizing flange 30 of the first seal case body 24 may then be bent radially outward to form the seal into the unitized seal assembly 10.

While we have disclosed and described preferred embodiments of the invention, it should be understood that the invention is not limited to the illustrated embodiments. For example, while the seal is described as being used in an environment wherein the inner seal case and rubber seal element are stationary and in contact with a rotating outer seal case sealing surface, it should be understood that the outer seal case may be stationary and the inner seal case and rubber seal element rotated. Similarly, the seal case with the rubber seal element molded thereon may be mounted as an outer element in contact with an inner sealing surface. Also, the outer cylindrical leg 52 of the seal case 50 may be eliminated with the leg 54 being mounted in the cylindrical bore to mount the seal. And although the illustrated embodiments show the first seal case with a stiffener flange 28 extending into the elastomer body 32, it is possible that the seal assembly could be made without such a stiffener flange 28. In addition, although the illustrated embodiments incorporate several of the desirable features of the invention, it is not necessary that all of the features of the invention be used; the claims of the invention should not be interpreted as including any of the features or structures or functions of the illustrated embodiments unless expressly set forth therein.

Accordingly, it should be understood that the invention is not limited to the embodiments disclosed but rather that it is intended to include all embodiments which will be apparent to one skilled in the art and which come within the spirit and scope of the invention.

We claim:

1. A unitized seal assembly for sealing a bearing used to support a housing having a cylindrical bore therein for rotation relative to a journal on a shaft extending coaxially into the cylindrical bore to provide a sealed lubrication chamber for the bearing, the seal assembly comprising:

a first seal case in the form of a ring having a generally channel shape axial cross section, said first seal case including a cylindrical mounting body portion terminating at each end in a generally radially extending flange;

an elastomer body carried by said first seal case and bonded to at least part of said seal case, said elastomer body being molded to provide a primary seal lip spaced radially from said first seal case body portion and a pair of dust seal lips spaced axially from said primary seal lip and from one another;

a second seal case including first, second and third radially spaced concentric cylindrical segments, said second and third cylindrical segments being joined at one end of the second seal case by a first generally radially extending portion positioned radially between said radially extending flanges of said first seal case, and said first and second cylindrical segments being joined at the other end of said second seal case by a second wall portion including a radially and axially inclined segment;

said second cylindrical segment having a cylindrical sealing surface contacting said primary seal lip to define a primary lubrication seal;

said inclined wall segment contacting at least one of said first dust seal lip and said second dust seal lip at a location spaced radially from said cylindrical sealing surface;

said first seal case body being adapted to be mounted in fluid-tight relation on one of a shaft and a cylindrical recess supported for relative rotation by a bearing, and said second seal case being adapted to be mounted in fluid-tight relation with the other of such shaft and cylindrical recess, and wherein said elastomer body has an axially directed lip defining a part of an annular groove in the elastomer body.

2. The unitized seal assembly defined in claim 1 wherein said axially directed lip is spaced from said third cylindrical segment of said second seal case throughout the length of the axially directed lip.

3. The unitized seal assembly defined in claim 1 wherein said axially directed lip has a free edge portion directed radially inward to provide rubbing contact with the outer cylindrical surface of said third cylindrical segment of said second seal case.

4. A unitary bearing seal mounted between a shaft and a bore in a relatively rotating member supported on the shaft by an antifriction bearing, the seal comprising:

a first annular seal case having an elongated cylindrical body for mounting in lubrication-tight relation on a shaft, said cylindrical body including a first radially outwardly extending flange at one end;

an annular molded elastomer body bonded onto at least part of said first seal case body, said elastomer body having integrally molded thereon a radially outwardly directed primary seal lip and at least one outwardly directed dust seal lip spaced axially from said primary seal lip;

an axially extending, generally cylindrical groove defined at least in part by said elastomer body, said groove being positioned at a location spaced radially inward from said primary seal lip, said groove terminating in a generally radially extending end wall;

a second annular seal case having a generally cylindrical mounting surface mounted in lubrication-tight relation in the bore of the relatively rotating member, said second seal case including a generally cylindrical segment having a radially inward directed sealing surface contacting and forming a seal with said primary seal lip, and a generally cylindrical leg concentric with and spaced radially inward from said sealing surface and radially outward from said first seal case body, said leg extending into said annular groove and terminating in a generally planar, substantially radially extending end face, at least said leg of said second seal case and said groove cooperating to define a labyrinth seal, said second seal case further including a generally radially extending wall joining said cylindrical segment and said leg, and another segment joining said cylindrical segment and said mounting surface;

at least two of said first seal case, second seal case and elastomer body cooperating to define an annular seal lubricant cavity sealed by said primary seal lip and said labyrinth seal;

said first seal case including a substantially radially extending flange on said elongated cylindrical body opposite said first flange to maintain said seal in a unitized configuration, said leg of said second seal case being positioned between said flanges of said first seal case;

said dust seal lip contacting at least one of the surfaces of the second seal case, and wherein said elastomer body extends along the outer cylindrical surface of said first seal case body portion for a distance at least about one-half the distance between said first and second flanges, and wherein said annular groove extends into said elastomer body adjacent the outer surface of said cylindrical body, said outer surface of said first seal case body defining part of the annular groove and labyrinth seal.

5. The unitized seal assembly defined in claim 4 wherein said elastomer body is molded to provide an axially extending resilient lip defining the part of the annular groove and labyrinth seal.

6. The unitized seal assembly defined in claim 5 wherein said resilient lip has a free edge portion directed radially inward to provide rubbing contact with the leg of said second seal case.

7. The unitized seal assembly defined in claim 5 wherein said resilient lip is spaced from the leg of the second seal case along the entire length of the lip.

* * * * *